UNITED STATES PATENT OFFICE.

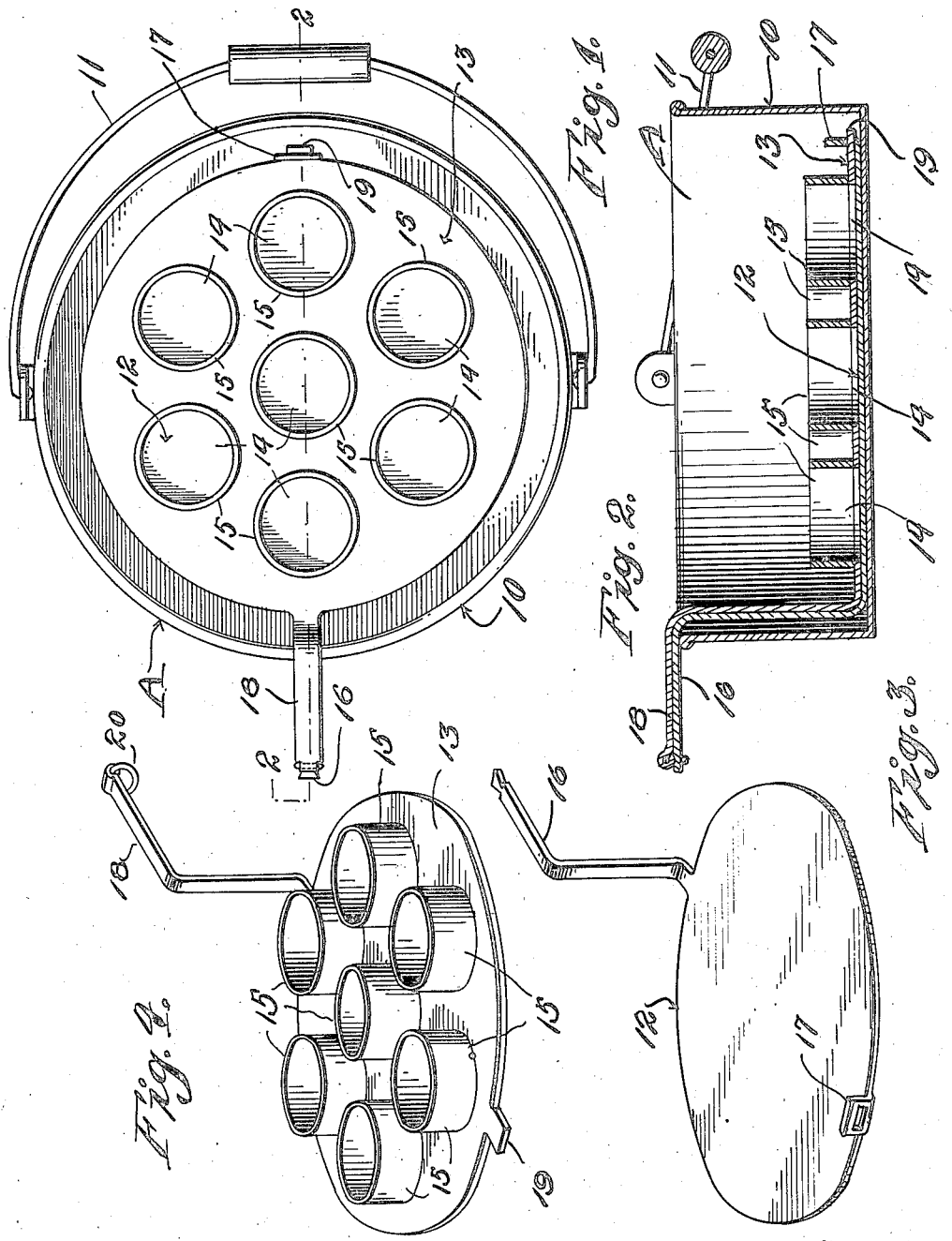

JOHN F. HUNHOLZ, OF WAMEGO, KANSAS.

COOKING UTENSIL.

1,070,476.

Specification of Letters Patent.

Patented Aug. 19, 1913.

Application filed January 22, 1913. Serial No. 743,580.

*To all whom it may concern:*

Be it known that I, JOHN F. HUNHOLZ, a citizen of the United States, residing at Wamego, in the county of Pottawatomie, State of Kansas, have invented certain new and useful Improvements in Cooking Utensils; and I do hereby declare the following to be a full, clear, and exact description of the invention, such as will enable others skilled in the art to which it appertains to make and use the same.

This invention relates to cooking utensils and particularly to a type for poaching eggs.

The object of the invention resides in the provision of a cooking utensil for poaching eggs which will prevent the egg from becoming diffused through the water during the cooking operation and thereby insure the proper poaching of the egg.

A further object of the invention resides in the provision of a cooking utensil of the type named which will enable the removal and distribution of the eggs when poached without breaking the film which surrounds the yolk of the egg.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a cooking utensil constructed in accordance with the invention, same being shown applied within a suitable water holding receptacle; Fig. 2, a section on the line 2—2 of Fig. 1. Fig. 3, a detail perspective view of the bottom element of the utensil, and Fig. 4, a detail perspective view of the top element of the utensil.

Referring to the drawings A indicates a suitable water holding receptacle which includes a cylindrical side wall 10 and a bail 11.

The cooking utensil proper is shown as comprising a bottom member 12 in the form of a circular disk, and a top member 13 also in the form of a circular disk with substantially the same diameter as the bottom member. The top member 13 is provided with a plurality of openings 14 each of which is surrounded by an annular flange 15 protruding from and secured to the upper side of the member 13. The member 12 is provided at diametrically opposite points with a radiating handle 16 and an upwardly directed perforated ear 17. The member 13 is also provided at diametrical opposite points with a radiating handle 18 and a radiating extension 19. The handle 18 is provided at its free end with a ring 20 for a purpose that will presently appear.

In the use of the utensil the member 13 is placed upon the member 12, the extension 19 being inserted in the opening of the ear 17. The ring 20 is then engaged over the free end of the handle 16 and in this manner the sections 12 and 13 are locked together. The sections 12 and 13 are then placed within the receptacle A and water poured into the latter. The egg is then deposited in each of the openings 14 and the cooking proceeded with in the usual manner. After the eggs are done the members 12 and 13 are removed from the receptacle A and disengaged from each other which will leave the cooked eggs neatly deposited upon the member 12 when they can be readily removed. It will be noted that the handles 16 and 18 are so shaped that when the members 12 and 13 are disposed in the receptacle A said handles will extend over the upper edge of the side wall 10 where they may be conveniently grasped.

What I claim is:—

An egg poacher comprising a pair of commensurate plates each having a radiating handle and an ear at the diametrically opposite point of its periphery, the ear of one plate being directed upwardly and perforated and the handle of that plate having a reduced extremity and the ear of the other plate being adapted to engage said perforation when the second plate is disposed upon the first plate and the second plate having the extremity of its handle depending and perforated to receive the extremity of the handle of the first plate, the second plate having a plurality of openings with an upstanding annular flange circumscribing each opening.

In testimony whereof, I affix my signature, in the presence of two witnesses.

JOHN F. HUNHOLZ.

Witnesses:
E. M. BRUNNER,
WM. S. COOPER.